United States Patent Office 3,366,646
Patented Jan. 30, 1968

3,366,646
HYDROGENATION PROCESS
Kenneth C. Dewhirst, San Pablo, Calif., assignor to Shell Oil Company, New York, N.Y., a corporation of Delaware
No Drawing. Filed June 23, 1965, Ser. No. 466,465
9 Claims. (Cl. 260—332.1)

ABSTRACT OF THE DISCLOSURE

Improved catalytic hydrogenation of non-aromatic carbon-carbon unsaturation is obtained by employing as a homogeneous hydrogenation catalyst a tris(tertiary phosphine or tertiary arsine)nitrosylrhodium complex, preferably in conjunction with excess tertiary phosphine or tertiary arsine ligand as a catalyst composition.

---

This invention relates to an improved process for the hydrogenation of unsaturated organic compounds, and to novel catalyst compositions employed therein.

The hydrogenation of unsaturated organic compounds by contact with molecular hydrogen in the presence of a hydrogenation catalyst has been extensively investigated. Broadly speaking, such processes are classifiable into two general categories depending upon the physical phase in which the catalyst is present during the hydrogenation process. In one process type, herein referred to as a heterogeneous hydrogenation process, the catalyst is essentially insoluble in the reaction medium. Typical heterogeneous catalysts include transition metals, e.g., nickel, cobalt, platinum, palladium and the like, as well as the oxides thereof, e.g., platinum oxide and palladium oxide, or mixed oxide catalysts such as copper chromite. Heterogeneous hydrogenation catalysts are customarily employed as pure materials in a finely divided state or are alternatively employed supported on inert carriers. Certain difficulties are inherent in heterogeneous catalysis. Among these are problems of maintaining contact between reactants and catalyst in the multi-phase reaction system and maintaining catalyst activity in view of the known tendency for the surface of heterogeneous catalysts to become "poisoned" by irreversible adsorption of reactant molecules or impurities in the reaction system, particularly low molecular weight sulfur-containing impurities.

These difficulties are largely overcome by utilization of a homogeneous hydrogenation catalyst, that is, a catalyst which is essentially completely soluble in the reaction medium. Substantially less is known about the formation or operation of homogeneous catalysts. In general, these catalysts are prepared in situ by reduction of a transition metal salt, e.g., an iron or cobalt salt, with an aluminum alkyl or similar reducing agent. Such homogeneous catalysts are generally characterized by instability and short catalyst life, and are neither isolable nor suitable for storage and subsequent use. In addition, the requirement for in situ formation of catalyst through the use of a reducing agent adds to the process handling difficulty and increases the process cost.

In co-pending application of K. C. Dewhirst, U.S. Ser. No. 417,482, filed Dec. 10, 1964, now Patent No. 3,311,623, a highly efficient catalyst composition and the use thereof in the catalysis of hydrogenation of carbon-carbon unsaturation is described and claimed. The catalyst compositions therein described comprise certain rhodium halide complexes with organic stabilizing ligands, particularly organic phosphines and arsines, which complexes are employed with a molar excess of the stabilizing ligand as a hydrogenation catalyst composition. The presence of the excess ligand in the compositions of the above co-pending application appears to impart stability to the rhodium halide complex, thereby affording an increased catalyst life, and additionally results in a hydrogenation rate substantialy higher than that obtained by the use of the rhodium halide complex in the absence of excess ligand. From practical considerations, the excess of stabilizing ligand is required for efficient utilization of the rhodium halide complexes as hydrogenation catalysts. Although, as previously stated, the rhodium halide complex compositions of the above co-pending application are highly efficient hydrogenation catalyst compositions, it would be of advantage to provide even more satisfactory homogeneous catalysts which are suitably utilized in a variety of hydrogenation processes.

It is an object of the present invention to provide an improved process for the catalytic hydrogenation of unsaturated organic compounds. An additional object is to provide a class of novel homogeneous hydrogenation catalysts and catalyst compositions to be employed in the improved hydrogenation process. More particularly, it is an object to provide certain rhodium complexes useful alone or in conjunction with other material as catalyst or catalyst compositions in homogeneous hydrogenation processes.

It has now been found that these objects are accomplished by the provision of homogeneous hydrogenation processes employing as the catalyst thereof certain rhodium (O) complexes wherein the rhodium is complexed with one nitrosyl ligand, i.e., one (NO) ligand, and at least two additional ligands which are organic in character. Although it is not desired to be bound by any particular theory, it appears probable that the nitrosyl ligand imparts sufficient stability to the rhodium complex so that the complex is itself useful as catalyst in certain applications, and when the complex is employed in conjunction with moderate quantities of excess organic ligand as a catalyst complex, highly efficient homogeneous hydrogenation processes become available.

The rhodium complex employed in the process of the invention comprises a rhodium atom having one nitrosyl ligand and at least two organic stabilizing ligands complexed therewith. It is considered likely that the rhodium complex undergoes chemical changes during its participation in the hydrogenation process so that no one formula suitably describes the actual catalytic species. In one modification of the process of the invention, the rhodium complex is introduced into the reaction system in a form represented by the formula

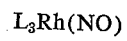

wherein L independently represents an organic stabilizing ligand as defined below. The rhodium in this complex is considered to have an oxidation state of 0 and a coordination number of 4. Although the precise nature of the rhodium species intermediates in the hydrogenation process is not known with certainty, it is thought probable that under the conditions of the hydrogenation process wherein the catalyst is utilized, i.e., in contact with molecular hydrogen, the rhodium functions as a "hydrogen carrier," initially reacting with hydrogen through the loss of an organic ligand, an increase in the coordination number of the rhodium, e.g., an increase in coordination number of from 4 to 5, and an increase in oxidation state from 0 to 2, thereby forming a species represented by the formula

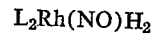

wherein L has the previously stated significance. It is herein considered that in the dihydrido complexes above depicted the rhodium exhibits an oxidation state of 2. Transfer of the hydrogen to an unsaturated organic molecule, which may also become transiently complexed with the rhodium, together with combination with an additional ligand, results in a return to a rhodium species of the lower coordination number and oxidation state, whereupon the cycle is repeated. The nitrosyl ligand is considered to impart sufficient stability to the rhodium complex intermediates so that addition, exchange, or loss of other ligands does not result in catalyst decomposition and deactivation.

It is therefore apparent that several related rhodium-nitrosyl ligand complexes are utilizable as catalyst or catalyst precursor. These complexes are generically classified as rhodium complexes of from 2 to 3 molecules of organic stabilizing ligand, as will be defined herein below, for each atom of rhodium present and one nitrosyl ligand for each atom of rhodium, with the proviso that two hydrogen ligands are additionally present for each rhodium atom when the number of organic ligands is 2. A preferred class of such rhodium complexes is represented by the formula $$L_mRh(NO)(H_2)_n$$

wherein L is organic ligand, $n$ is a whole number from 0 to 1 inclusive, and the sum of $m+n$, i.e., the term $(m+n)$ equals 3.

In a preferred modification of the process of the invention, the $L_3Rh(NO)$ catalyst is introduced to the reaction system as a preformed material. The production of rhodium complexes of this type is described by Hieber et al., Z. Anorg. u. Allgem. Chem., 316, 321 (1962). In an alternate modification of the process, the nitrosyl-rhodium (O) complex is prepared in situ as by the addition to the reaction mixture of a catalyst precursor complex, for example a complex of the formula $$L_2Rh(NO)X_2$$

wherein L has the previously stated significance and X is halogen, particularly chlorine. The production of dichloro complexes of this type is also described by Hieber et al. In contact with molecular hydrogen in the present process, reaction of the dihalo rhodium complex above depicted with molecular hydrogen and an L ligand, obtained either from another molecule of complex or from an excess of ligand additionally provided in the reaction system, provides the rhodium complex $L_2Rh(NO)H_2$, considered to be one catalyst species, and a hydrogen halide. At low catalyst concentrations, the hydrogen halide by-product does not appear to have any great detrimental effect, and the rate of hydrogenation obtained by providing the catalyst as $L_2Rh(NO)X_2$ is essentially the same as that obtained by providing the catalyst as $L_3Rh(NO)$ when low catalyst concentrations are employed. To obtain best results in such an in situ modification, it is preferred to add at least a stoichiometric amount of excess ligand L to facilitate the cyclic transformation of catalyst species which involves species having three L groups per molecule. Despite this practical requirement for excess ligand, and the somewhat detrimental effect of the hydrogen halide by-product at comparatively high catalyst concentrations, such an in situ method of providing catalyst is quite satisfactory.

In the preferred modification of the process of the invention, therefore, the nitrosyl rhodium complex is provided in a form generically represented by the formula $$L_mRh(NO)(Z_2)_n$$

wherein L, $m$ and $n$ have the previously stated significance and Z is selected from hydrogen and halogen, which halogen is preferably halogen of atomic number from 17 to 35, i.e., the middle halogens chlorine and bromine, especially chlorine.

The term L in the above formulas independently represents an organic ligand employed in the nitrosylrhodium complex and additionally although independently represents the excess ligand present when the homogeneous hydrogenation catalyst to be employed is a catalyst composition. Although organic ligands such as carbonyl, olefin, phenol and thiophenol are in part operable, the preferred L ligand is a trisorgano derivative of an element of Group V–A of the Periodic Table having an atomic number from 15 to 33, i.e., phosphorus and arsenic, characterized by each valence of the Group V–A element being satisfied by direct bonding to a carbon atom of the organo moiety. Thus, the preferred organic ligands are phosphines or arsines and are represented by the formula $$R_3E$$

wherein E is the Group V–A element of atomic number from 15 to 33 and R independently is an organo group having up to 20 carbon atoms, preferably up to 10, and having only aromatic unsaturation, that is, R is free from aliphatic carbon-carbon unsaturation. R is therefore saturated aliphatic, saturated cycloaliphatic, or is aromatic in character, preferably mononuclear aromatic, and is hydrocarbyl, that is, contains only atoms of carbon and hydrogen, or is substituted-hydrocarbyl containing in addition to atoms of carbon and hydrogen, other atoms such as oxygen, sulfur, nitrogen, and halogen, particularly halogen of atomic number from 9 to 35, which atoms are present in functional groups such as alkoxy, carboalkoxy, acyl, trihalomethyl, halo, cyano, dialkylamino, sulfonylalkyl, alkanoyloxy and like groups having no active hydrogen atoms. A preferred class of nonhydrocarbonyl substituents comprises an atom having an atomic number from 7 to 8, i.e., nitrogen or oxygen, one valence of which is satisfied by bonding to an otherwise hydrocarbyl E-substituent, and the remaining valence(s) are satisfied by bonding to lower alkyl radicals which are alkyl of from 1 to 4 carbon atoms. Such preferred oxygen- or nitrogen-containing non-hydrocarbyl substituents are alkoxy wherein the alkyl moiety is alkyl of up to 4 carbon atoms and N,N-dialkylamino wherein each alkyl independently is alkyl of up to 4 carbon atoms.

Illustrative of suitable aliphatic and cycloaliphatic R groups are hydrocarbyl R groups such as methyl, ethyl, propyl, isopropyl, butyl, isooctyl, decyl, lauryl, stearyl, cyclohexyl, cyclopentyl, 3,4-dimethylcyclopentyl, cyclooctyl, benzyl and β-phenylethyl; as well as substituted-hydrocarbyl groups such as 4-bromohexyl, methoxymethyl, 3-(diethylamino)propyl, 4-carbethoxybutyl, and 2-acetoxyethyl. Aromatic R groups are those wherein the E moiety is bonded directly to an aromatic ring and include hydrocarbyl aromatic groups such as phenyl, tolyl, xylyl, p-ethylphenyl, p-tert-butylphenyl, m-octylphenyl, 2,4-diethylphenyl, p-phenylphenyl, m-benzylphenyl and 2,4,6-trimethylphenyl; as well as substituted-hydrocarbyl aromatic R groups including p-methoxyphenyl, m-chlorophenyl, m-trifluoromethylphenyl, p-propoxyphenyl, p-carbethoxyphenyl, 2,4-dichlorophenyl, 2-ethyl-5-bromophenyl, p-dimethylaminophenyl, m-diethylaminophenyl, 3,5-dibutoxyphenyl, p-acetoxyphenyl, 2-hexyl-3-methylsulfonylphenyl, 3,5-bis - (trichloromethyl)phenyl and 3-dibutylaminophenyl.

In the $R_3E$ ligand as defined above, the R moieties are the same or are different, although ligands wherein all R groups are the same are generally preferred. Exemplary R groups include phosphines such as triethylphosphine, tributylphosphine, triphenylphosphine, tris(4-methoxyphenol)phosphine, tris(4-tolyl)phosphine, tris(3-chlorophenyl)phosphine, tris(4 - dimethylaminophenyl)phosphine, diphenylhexylphosphine, dimethyl(3 - methoxyphenyl)phosphine, dibutylstearylphosphine, tribenzylphosphine, cyclohexyldibutylphosphine and the like; and arsines such as triphenylarsine, ditolylphenylarsine, tris(4-ethoxyphenyl)arsine, diphenylcyclohexylarsine, dibutylphenylarsine, and the like. In general, phosphine ligands are preferred over analogous arsine ligands, and ligands wherein the phosphorus substituents are aromatic are generally preferred over wholly aliphatic phosphine ligands. Largely because of economic reasons, triphenylphosphine is a particularly preferred ligand.

The nitrosylrhodium complexes are prepared by several methods. By the methods of the above-listed reference, the complexes are prepared directly. An alternate procedure for the formation of the rhodium complexes is by ligand exchange in the hydrogenation process medium. This in situ formation of catalyst complex comprises the addition of a readily prepared nitrosylrhodium complex and an excess of the ligand whose introduction into the catalyst complex is desired. For example, addition of tris(triphenylphosphine)nitrosylrhodium (O) and excess tributylphosphine to the hydrogenation process reaction medium forms in situ a catalyst complex which effectively operates in the manner of tris(tributylphosphine)nitrosylrhodium (O).

In the process of the invention, the nitrosylrhodium complexes are suitably employed in the presence or alternatively in the absence of excess organic stabilizing ligand. In the modifications where the organic unsaturate to be hydrogenated is relatively simple in structure, for example a hydrocarbon olefin such as hexene, octene or the like, satisfactory results are obtained when the nitrosylrhodium complex is utilized as catalyst without the addition of an excess of stabilizing ligand. Even in these instances, however, better results are generally obtained when an excess of organic stabilizing ligand is employed in conjunction with the nitrosylrhodium complex, the combination being considered a catalyst composition. Although no apparent detriment arises from the use of large amounts of excess organic stabilizing ligand, amounts of excess ligand greater than about 20 moles of excess ligand per mole of nitrosylrhodium complex generally offer no further advantage. As previously stated, the presence of excess ligand is not always required, so that, broadly speaking, the present invention contemplates a homogeneous hydrogenation process employing as catalyst, or as catalyst composition, the above-depicted nitrosylrhodium complex with from 0 to 20 moles of excess organic stabilizing ligand per mole of the rhodium complex. Preferred catalyst compositions are those of from about 3 moles to about 15 moles of excess ligand per mole of catalyst complex, and especially preferred are catalyst compositions of from about 6 moles to about 12 moles of excess ligand per mole of nitrosylrhodium complex.

In the hydrogenation process of the invention, the catalyst or catalyst composition is employed to catalyze the homogeneous hydrogenation of an unsaturated organic molecule by contact of the unsaturate with molecular hydrogen. The advantage observed in the present process resides in the efficient catalysts of hydrogenation rather than in the hydrogenation of any particular type of unsaturated compound, as the process is broadly applicable to the hydrogenation of a number of types of unsaturated organic molecules. In general, the unsaturated molecules employed in the hydrogenation process of the invention contain from 2 to 20 carbon atoms and contain from 1 to 4 non-aromatic carbon-carbon multiple bonds which are preferably ethylenic. A principal advantage gained through utilization of the catalyst compositions of the invention resides in the observed selectivity toward hydrogenation of non-aromatic carbon-carbon unsaturation in the presence of unsaturation of other types. Thus, the hydrogenation process is applied to the hydrogenation of unsaturated molecules containing aromatic unsaturation or unsaturated non-hydrocarbyl functional groups such as cyano, carbonyl, sulfonyl, and the like with consequent efficient saturation of the non-aromatic carbon-carbon unsaturation with little or no effect on the unsaturation of the other types being observed. For example, hydrogenation of acrylonitrile under the conditions of the process of the invention results in the production of high yields of propionitrile with little or no attendant reduction of the cyano moiety.

Illustrative of suitable substrates containing non-aromatic carbon-carbon ethylenic unsaturation are hydrocarbons such as ethylene, propylene, 1-butene, 1-hexene, 3-octene, cyclopentene, cyclooctadiene, propenylbenzene, biallyl, 2-dodecene, butadiene, isoprene, trivinylbenzene, 2,6,8-octadecatriene and vinylcyclohexene; unsaturated nitriles such as acrylonitrile, 4-cyanobutene, 2-methyleneglutaronitrile and methacrylonitrile; unsaturated carbonylic compounds such as methyl vinyl ketone, propyl isopropenyl ketone, crotonaldehyde and cinnamic aldehyde; unsaturated sulfones such as methyl vinyl sulfone, phenyl butadienyl sulfone, and sulfolene; and unsaturated amides such as N,N-dimethylacrylamide.

The process is also applicable to the hydrogenation of polymeric materials which contain regularly occurring carbon-carbon unsaturation or only occasional carbon-carbon multiple linkages. Illustrative of such polymeric materials are those polymers prepared from 1,4-polymerization of butadiene or isoprene with a variety of other monomers, which polymers contain divalent 2-butenyl moieties. Hydrogenation of such polymeric materials according to the process of the invention results in the effective conversion of the butenyl moieties to butyl moieties, thereby modifying the properties of the polymer. In like manner, other polymeric materials incorporating carbon-carbon unsaturation are converted to the corresponding saturated derivative by the process of the invention.

The nitrosylrhodium complex is employed in catalytic quantities. Amounts of rhodium complex from about 0.00001% mole to about 1% mole based upon the material to be hydrogenated are generally satisfactory although amounts or rhodium halide complex from about 0.0001% mole to about 0.1% mole on the same basis are preferred.

The hydrogenation process is typically conducted in liquid-phase solution in the presence or the absence of an inert solvent that is non-hydrogenatable under the conditions of the reaction. Illustrative solvents include hydrocarbons free from non-aromatic unsaturation such as benzene, toluene, xylene, cumene, isooctane, cyclohexane, and methylcyclopentane; nitriles such as propionitrile, acetonitrile and benzonitrile; sulfones such as sulfolane, diethyl sulfone and methyl butyl sulfone; ethers including dialkyl ethers such as diethyl ether, dibutyl ether and propyl hexyl ether, lower alkyl ethers (full) of polyhydric alcohols and poly(oxyalkylene)glycols such as dimethoxyethane, glycerol triethyl ether, diethylene glycol dimethyl ether and tetraethylene glycol diethyl ether; alcohols including lower alkanols such as ethanol, isopropanol, sec-butanol and hexanol, as well as ether-alcohols, e.g., the Cellosolves and the Carbitols; and phenols including phenol, p-chlorophenol, m-ethylphenol and m-bromophenol. It is, of course, within the contemplated scope of the process of the invention to employ no reaction solvent as when the catalyst composition is soluble in the unsaturated organic reactant.

The hydrogenation process is typically conducted by mixing the material to be hydrogenated, the solvent if any, the nitrosylrhodium complex and any excess stabilizing ligand in an autoclave or similar pressure vessel and pressurizing the reactor with hydrogen. The method of mixing is not material. One reaction component may be added to the others in increments, although it is equivalently useful to initially mix the entire amounts of reaction mixture components. The hydrogenation process is conducted at convenient temperatures and at an atmospheric or superatmospheric pressure of hydrogen. Suitable reaction temperatures vary from about 0° C. to about 180° C., the optimum temperature depending in part upon the particular catalyst complex and unsaturated organic material employed. Best results are obtained when the reaction temperature is from about 20° C. to about 130° C. Hydrogen pressures from about 1 atmosphere to about 200 atmospheres are generally satisfactory and the reaction pressure range from about 10 atmospheres to about 100 atmospheres of hydrogen is preferred.

Subsequent to reaction, the product mixture is separated and the desired product is recovered by conventional means such as fractional distillation, selective extraction, crystallization, chromatographic techniques and the like.

The products of the hydrogenation process are organic compounds wherein the ethylenic linkage present in the reactant molecule has been saturated by the addition of a molecule of hydrogen thereto. Illustrative hydrogenation products include propionitrile produced by hydrogenation of acrylonitrile, n-hexane produced by hydrogenation of 1-hexene and sulfolane produced by the hydrogenation of sulfolene. As previously stated, the process of the invention is characterized by efficient reduction of nonaromatic carbon-carbon unsaturation with little or no tendency toward hydrogenation of other types of unsaturation present in the reactant molecule.

To further illustrate the improved method of hydrogenation and the novel catalyst compositions employed therein, the following examples are provided. It should be understood that the details thereof are not to be regarded as limitations, as they may be varied as will be understood by one skilled in this art.

*Example I*

To an autoclave were charged 6.7 g. of hexene-1 in 20 ml. of toluene, 10 mg. of tris(triphenylphosphine)nitrosylrhodium (O) and 10 mg. of triphenylphosphine. The reactor was pressurized to 600 p.s.i.g. with hydrogen and maintained at 80° C. for approximately 4 hours. Gas-liquid chromatography of the product mixture indicated that an 85% conversion of the hexene-1 had taken place, and the yield of n-hexane based on hexene-1 converted was 100%.

*Example II*

By procedures similar to that of Example I, relative rates of hydrogenation employing various catalyst complexes of the invention were determined. In each case, 10 ml. of hexene-1 in 20 ml. of propionitrile were contacted with molecular hydrogen at a pressure of 600 p.s.i.g. in the presence of 10 mg. of the rhodium complex and 250 mg. of triphenylphosphine and the initial rate of hydrogenation determined from the pressure drop within the reactor as a function of time. The results are shown in Table I.

TABLE I

| Complex | Temp., °C. | Rate, p.s.i./hr. |
|---|---|---|
| [(C$_6$H$_5$)$_3$P]$_2$Rh(NO)Cl$_2$ | 90 | 460 |
| [(C$_6$H$_5$)$_3$P]$_3$Rh(NO) | 60 | 470 |

*Example III*

To determine the effect of excess ligand in the catalyst compositions of the invention, experiments were conducted employing 8.7 mg. of dichlorobis(triphenylphosphine)nitrosylrhodium (II) as the complex and various quantities of excess ligand, in this experiment triphenylphosphine, to catalyze hydrogenation of 10 ml. of hexene-1 in 20 ml. of propionitrile as solvent at a temperature of 90° C. and 1000 p.s.i.g. The initial rate of hydrogenation was determined by measuring the pressure drop within the reactor as a function of time. The results are shown in Table II.

TABLE II

| Weight added ligand, mg.: | Rate, p.s.i./hr. |
|---|---|
| 0 | 150 |
| 8.7 | 270 |
| 17 | 340 |
| 34 | 350 |
| 140 | 420 |
| 560 | 400 |

Similar results are obtained when dibromobis(triphenylphosphine)nitrosylrhodium (II) is employed as catalyst complex.

*Example IV*

By a procedure similar to that of Example III, experiments were conducted with excess ligand of varying structure. In each case 250 mg. of excess ligand was employed, and the relative rate of hydrogenation was determined and compared with the rate obtained using triphenylphosphine as the added ligand, to which an arbitrary rate value of 100 was assigned. The results are shown in Table III.

TABLE III

| Ligand: | Relative rate |
|---|---|
| Triphenylphosphine | 100 |
| Tributylphosphine | 18 |
| Tris(p-methoxyphenyl)phosphine | 320 |

*Example V*

In an additional comparative experiment, the rate of hydrogenation of hexene-1 was determined according to the procedure of Example III employing various hydrogenation media. The rate of hydrogenation in m-cresol solution was over twice as fast as that obtained in propionitrile.

*Example VI*

A series of preparative experiments was conducted employing a variety of unsaturated organic materials. In each case, dichlorobis(triphenylphosphine)nitrosylrhodium (II) was employed as the rhodium complex and unless otherwise stated, excess triphenylphosphine ligand was added to form the catalyst composition.

(a) To 20 mg. of the complex and 100 mg. of excess ligand was added 7.8 g. of acrylonitrile. Hydrogenation was effected at a temperature of 82° C. and an initial hydrogen pressure of 600 p.s.i.g. The theoretical quantity of hydrogen had been absorbed at the end of 4 hours and gas-liquid chromatographic analysis of the product indicated a quantitative conversion to propionitrile.

(b) The hydrogenation of 8.5 g. of mesityl oxide in 10 ml. of benzene was conducted in like manner except that a temperature of 96° C. was employed. At the end of 4 hours, the theoretical quantity of hydrogen had been absorbed and gas-liquid chromatographic analysis indicated a quantitative conversion of the mesityl oxide to methyl isobutyl ketone.

(c) The hydrogenation of 10 g. of sulfolene in 20 ml. of propionitrile was conducted in like manner, except that 50 mg. of the nitrosylrhodium complex and a reaction temperature of 56° C. were employed. At the end of 16 hours, the theoretical quantity of hydrogen had been absorbed and gas-liquid chromatography indicated a 95% yield of sulfolane based on sulfolene charged.

(d) By a similar procedure, 6.7 g. of hexene-1 in 20 ml. of propionitrile was mixed with 8.7 mg. of the nitrosylrhodium complex and 250 mg. of tris(p-methoxyphenyl)phosphine. At the end of three hours, gas-liquid chromatographic analysis of the product indicated a conversion to hexane of 85% and the yield of hexane based on hexene-1 converted was 100%.

(e) When the procedure of part (d) is repeated except that triphenylarsine is employed as the excess ligand, a good yield of hexane is obtained.

*Example VII*

To an autoclave were charged 20 mg. of dichlorobis(triphenylphosphine)nitrosylrhodium (II), 10 ml. of hexene-1 and 20 ml. of propionitrile. The reactor was pressurized to 600 p.s.i.g. with hydrogen and the reaction mixture was maintained at 84° C. until hydrogenation reached apparent completion, about 5 hours. The product mixture was analyzed by gas-liquid chromatography which analysis indicated a conversion of hexene-1 to hexane of 90%.

When the above experiment was repeated at 70° C.

employing 20 ml. of triphenylphosphine as excess ligand, the conversion to hexane was found by gas-liquid chromatographic analysis to be 100%.

I claim as my invention:

1. In the process for the homogeneous hydrogenation of an unsaturated organic compound of from 2 to 20 carbon atoms and from 1 to 4 non-aromatic carbon-carbon multiple bonds by contacting said unsaturated organic compound with molecular hydrogen in the presence of homogeneous hydrogenation catalyst, the improvement comprising employing as the homogeneous hydrogenation catalyst a catalyst composition comprising:

(a) nitrosylrhodium complex represented by the formula $$(R_3E)_m Rh(NO)(Z_2)_n$$

wherein Z is selected from the group consisting of hydrogen and halogen, $n$ is a whole number from 0 to 1 inclusive, the sum of $n+m$ equals 3, E independently is Group V–A element of atomic number from 15 to 33, and R independently is a group of from 1 to 20 carbon atoms, is free from aliphatic carbon-carbon unsaturation, and is selected from hydrocarbyl saturated aliphatic, hydrocarbyl saturated cyclo-aliphatic, hydrocarbyl aromatic, substituted-hydrocarbyl saturated aliphatic, substituted-hydrocarbyl saturated cyclo-aliphatic and substituted-hydrocarbyl aromatic wherein the substituents of said substituted-hydrocarbyl moieties are free from aliphatic carbon-carbon unsaturation and are selected from alkoxy, carboalkoxy, trihalomethyl, halo, cyano, dialkylamino, sulfonylalkyl and alkanoyloxy, and said R is attached to said E atom by carbon-E bonds; and (b) up to about 15 moles of $R_3E$ per mole of said nitrosylrhodium complex.

2. The process of claim 1 wherein $n$ is 0, $m$ is 3, and R independently is of up to 10 carbon atoms.

3. The process of claim 2 wherein E is phosphorus and R independently is a substituted-hydrocarbyl saturated aliphatic, substituted-hydrocarbyl saturated cyclo-aliphatic or substituted-hydrocarbyl aromatic group wherein the substituent is alkoxy of up to 4 carbon atoms or N,N-dialkylamino wherein each alkyl independently is alkyl of up to 4 carbon atoms.

4. The process of claim 1 wherein $n$ is 1, $m$ is 2, Z is halogen of atomic number from 17 to 35, and R independently is of up to 10 carbon atoms.

5. The process of claim 4 wherein E is phosphorus, Z is chlorine and R independently is a substituted-hydrocarbyl saturated aliphatic, substituted-hydrocarbyl saturated cyclo-aliphatic or substituted-hydrocarbyl aromatic group wherein the substituent is alkoxy of up to 4 carbon atoms or N,N-dialkylamino wherein each alkyl independently is alkyl of up to 4 carbon atoms.

6. The process of claim 5 wherein $R_3E$ is tris(p-methoxyphenyl)phosphine.

7. The process of claim 1 wherein E is phosphorus and R independently is a hydrocarbyl saturated aliphatic, hydrocarbyl saturated cyclo-aliphatic and hydrocarbyl aromatic group and is of up to 10 carbon atoms.

8. The process of claim 7 wherein $R_3E$ is triphenylphosphine.

9. The process of claim 7 wherein $R_3E$ is tributylphosphine.

References Cited

UNITED STATES PATENTS

| | | | |
|---|---|---|---|
| 3,110,747 | 11/1963 | Mullineaux | 260—683 |
| 3,130,237 | 4/1964 | Wald | 260—638 |

OTHER REFERENCES

Hieber et al.: Chemical Abstracts, vol. 56, col. 12522g (1962).

Hieber et al.: Z. Anorg. u. Allgem Chemie, vol. 316, page 321 (1962).

JOHN D. RANDOLPH, *Primary Examiner.*

WALTER A. MODANCE, NORMA S. MILESTONE, *Examiners.*

C. M. SHURKO, *Assistant Examiner.*

UNITED STATES PATENT OFFICE
CERTIFICATE OF CORRECTION

Patent No. 3,366,646 January 30, 1968

Kenneth C. Dewhirst

It is certified that error appears in the above identified patent and that said Letters Patent are hereby corrected as shown below:

Column 1, lines 62 and 63, cancel "now Patent No. 3,311,623".

Signed and sealed this 31st day of March 1970.

(SEAL)
Attest:

Edward M. Fletcher, Jr.
Attesting Officer

WILLIAM E. SCHUYLER, JR.
Commissioner of Patents